United States Patent
Cosandier et al.

(10) Patent No.: US 11,572,918 B2
(45) Date of Patent: Feb. 7, 2023

(54) PIVOT MECHANISM WITH FLEXIBLE ELEMENTS FOR LARGE-AMPLITUDE ROTATION GUIDING AND PIVOT ASSEMBLY COMPRISING A PLURALITY OF SAID PIVOT MECHANISM

(71) Applicant: CSEM Centre Suisse d'Electronique et de Microtechnique SA - Recherche et Developpement, Neuchatel (CH)

(72) Inventors: Florent Cosandier, Colombier (CH); Philippe Schwab, Grandevent (CH); Lionel Kiener, Pomy (CH)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 656 days.

(21) Appl. No.: 16/166,864

(22) Filed: Oct. 22, 2018

(65) Prior Publication Data
US 2019/0120287 A1    Apr. 25, 2019

(30) Foreign Application Priority Data

Oct. 24, 2017 (EP) .................................... 17198118

(51) Int. Cl.
*F16C 11/12*    (2006.01)
*B64G 1/22*    (2006.01)
(Continued)

(52) U.S. Cl.
CPC .............. *F16C 11/12* (2013.01); *B64G 1/222* (2013.01); *B64G 1/66* (2013.01); *F16D 3/005* (2013.01);
(Continued)

(58) Field of Classification Search
CPC .. B64G 1/22; B64G 1/222; B64G 1/66; F16C 11/12; Y10T 403/32614; Y10T 403/32557;
(Continued)

(56) References Cited

U.S. PATENT DOCUMENTS

| 2,793,028 A | * | 5/1957 | Wheeler | ................. F16C 11/12 |
| | | | | 267/160 |
| 2,907,563 A | * | 10/1959 | Verde | ..................... F16C 11/12 |
| | | | | 267/160 |

(Continued)

FOREIGN PATENT DOCUMENTS

| DE | 3241373 A1 * | 5/1984 | .............. F16C 11/12 |
| EP | 0974761 A1 | 1/2000 | |

(Continued)

OTHER PUBLICATIONS

Henein, Simon & Spanoudakis, Peter & Droz, Serge & Myklebust, Leif & Onillon, Emmanuel. (2003). Flexure pivot for aerospace mechanisms. European Space Agency, (Special Publication) ESA SP. (Year: 2003).*

(Continued)

*Primary Examiner* — Michael P Ferguson
(74) *Attorney, Agent, or Firm* — Pearne & Gordon LLP

(57) ABSTRACT

A pivot mechanism for guiding in rotation comprises a mobile element connected to a fixed element through flexible connections; with the flexible elements being configured to guide the mobile element according to a rotational movement in a plane, around a pivoting axis perpendicular to the plane; with each of the flexible connections comprising an intermediary junction provided with an expansion slot, the expansion slot being configured to expand during the rotation of the mobile element, so that the mobile element can pivot according to a second angular amplitude that is greater than a first angular amplitude achieved without said expan- (Continued)

sion slot; with the intermediary junctions being connected to one another by a coupling member; each of the coupling members being configured so as to prevent a movement out of the plane and a lateral movement in the plane of the mobile element. The pivot mechanism has a very high rotational amplitude.

12 Claims, 10 Drawing Sheets

(51) Int. Cl.
| | | |
|---|---|---|
| *G12B 5/00* | (2006.01) | |
| *B64G 1/66* | (2006.01) | |
| *G04B 17/04* | (2006.01) | |
| *F16D 3/00* | (2006.01) | |
| *G01C 19/22* | (2006.01) | |

(52) U.S. Cl.
CPC ............ *G04B 17/045* (2013.01); *G12B 5/00* (2013.01); *F16C 2326/05* (2013.01); *G01C 19/22* (2013.01); *Y10T 403/45* (2015.01); *Y10T 403/54* (2015.01)

(58) Field of Classification Search
CPC .. Y10T 403/45; Y10T 403/455; Y10T 403/54
See application file for complete search history.

(56) References Cited

U.S. PATENT DOCUMENTS

| | | | | | |
|---|---|---|---|---|---|
| 2,920,498 | A | * | 1/1960 | Federn | F16C 11/12 74/470 |
| 2,966,049 | A | * | 12/1960 | Ormond | F16D 3/005 464/51 |
| 3,203,739 | A | * | 8/1965 | Young | F16D 3/50 403/291 |
| 3,312,458 | A | * | 4/1967 | Erland | F16C 11/12 267/160 |
| 3,943,778 | A | * | 3/1976 | Wyse | F16D 3/005 29/445 |
| 4,261,211 | A | * | 4/1981 | Haberland | B23H 9/00 267/160 |
| 4,269,072 | A | * | 5/1981 | Duncan | F16C 11/12 403/291 |
| 4,297,904 | A | * | 11/1981 | Morton | G01C 19/22 29/434 |
| 4,499,778 | A | * | 2/1985 | Westhaver | G01C 19/22 228/135 |
| 4,655,096 | A | * | 4/1987 | Westhaver | G01C 19/22 464/100 |
| 5,302,044 | A | * | 4/1994 | Spariat | B64G 1/641 403/291 |
| 5,492,313 | A | * | 2/1996 | Pan | F16F 1/025 267/161 |
| 5,529,277 | A | * | 6/1996 | Ostaszewski | F16C 11/12 248/398 |
| 6,146,044 | A | * | 11/2000 | Calvet | F16C 11/12 403/119 |
| 6,267,363 | B1 | * | 7/2001 | Genequand | F16C 11/12 248/567 |
| 6,283,666 | B1 | * | 9/2001 | Genequand | F16C 11/12 403/119 |
| 7,093,827 | B2 | * | 8/2006 | Culpepper | F16C 11/12 267/160 |
| 7,270,319 | B2 | * | 9/2007 | Culpepper | F16C 11/12 267/160 |
| 7,296,481 | B2 | * | 11/2007 | Kahle | G01F 1/80 73/856 |
| 8,734,043 | B2 | * | 5/2014 | Jeandot | B64G 1/66 403/111 |
| 8,899,869 | B2 | * | 12/2014 | Valois | F16C 11/12 403/291 |
| 9,079,672 | B2 | * | 7/2015 | Baudasse | B64G 1/66 |
| 9,212,692 | B2 | * | 12/2015 | Baudasse | B64G 1/66 |
| 9,400,378 | B2 | * | 7/2016 | Xu | G02B 21/26 |
| 9,759,263 | B1 | * | 9/2017 | Salas | F16C 11/12 |
| 10,914,339 | B2 | * | 2/2021 | Warden | G02B 26/105 |
| 2003/0235460 | A1 | * | 12/2003 | Moon | F16C 11/12 403/291 |
| 2004/0037626 | A1 | * | 2/2004 | Awtar | F16C 11/12 403/223 |
| 2006/0252297 | A1 | | 11/2006 | Culpepper | |
| 2018/0319517 | A1 | * | 11/2018 | Blecha | F16C 11/12 |

FOREIGN PATENT DOCUMENTS

| | | | | |
|---|---|---|---|---|
| EP | 2256039 A1 | | 12/2010 | |
| WO | WO 2017/055983 | * | 4/2017 | ............ F16C 11/12 |
| WO | 2017077469 A1 | | 5/2017 | |

OTHER PUBLICATIONS

Search Report issued in European Application No. 17198118 dated Apr. 3, 2018.

* cited by examiner

PIVOT MECHANISM WITH FLEXIBLE ELEMENTS FOR LARGE-AMPLITUDE ROTATION GUIDING AND PIVOT ASSEMBLY COMPRISING A PLURALITY OF SAID PIVOT MECHANISM

This application claims priority from European application EP17198118.6 filed Oct. 24, 2017, the content of which is incorporated by reference herein in its entirety.

TECHNICAL FIELD

The present invention concerns a pivot mechanism for precise rotational guiding and that allows a greater angular range to be covered. The present invention also concerns a pivot assembly comprising a plurality of pivot mechanisms.

STATE OF THE ART

Document EP0974761 describes a pivot with flexible elements allowing an angular stroke shorter than that of the proposed invention. This pivot offers a higher stiffness but exhibits many overconstraints. It provides a clearance around its central shaft, which is an advantage. It also proposes couplings at the intermediate levels, but the latter do not provide the same advantages as those of the present invention, namely: isostatics, low non-linearity of the stiffness, long stroke. It is possible to stack it like the present invention.

EP2256039 describes a pivot with radial blades that provides a stroke considerably shorter than that of the proposed invention. It also offers a clearance around its central shaft and proposes rigid couplings at the intermediate levels, which is highly unfavorable for a long stroke. Variants propose successive level stacks or even a sandwich arrangement, i.e. where the second level is distributed in two equal halves arranged outside the first level. This prevents a torsion movement of the intermediate portions as well as an axial displacement of the pivot's output. This pivot proposes an arrangement of the blades with the input and output of the mechanism inside whilst the intermediate level is placed on the outside.

WO2017077469 describes a pivot allowing a wide angular range to be covered. The apparent parasite shortening movement of the blades is shifted to the outside of the pivot, in the roots of the radial blades, which causes the pivot assembly to become less rigid. The pivot has non-coupled intermediary connections that firstly constitute internal degrees of freedom, which are highly unfavorable for resistance to vibrations, and secondly, due to the absence of coupling between the intermediary connections, the lateral stiffness is considerably worsened, particularly in a deflected position of the pivot.

The flexible pivots presented in the state of the art are generally constituted of simple pivots that are stacked serially when the angular range needs to be increased.

BRIEF SUMMARY OF THE INVENTION

The invention described here proposes a pivot mechanism for guiding in rotation, comprising a mobile element connected to a fixed element through flexible connections; with the flexible elements being configured so as to guide the mobile element according to a rotational movement in a plane, around a pivoting axis of the pivot, perpendicular to the plane; with each of the flexible connections comprising an intermediary junction, each intermediary junction being separated from the adjacent intermediary junctions by an expansion slot, the expansion slot being configured to expand during the rotation of the mobile element, so that the latter can pivot according to a second angular amplitude that is greater than a first angular amplitude achieved without said expansion slot; the intermediary junctions being connected to one another by a coupling member; each of the coupling members being configured so as to prevent a movement out of the plane and a lateral movement in the plane of the mobile element.

The invention described here proposes a pivot mechanism for guiding in rotation having parallel kinematics. In the pivot mechanism with parallel kinematics, the output (the mobile element) is connected to a fixed base through several independent kinematic chains (in parallel). This configuration offers a remarkable performance in terms of precision and stiffness among others. Stiffness performance is understood to be high ratios between the stiffness of the blocked transverse movements and the stiffness of the free movement of the pivot around its rotational axis. Although the stiffness performance can often be accompanied by a high degree of overconstraint, this is not the case of the structure presented here, which effectively describes a near-isostatic mechanism.

In the pivot mechanism of the invention, a possible parasite movement is absorbed inside the pivot by coupling members, which tends to rigidify the whole of the blocked movements of the pivot.

In the pivot mechanism of the invention, no degree of internal freedom is sensitive to vibrations or creates a loss of rigidity when the pivot mechanism is pivoted relative to a position of equilibrium and the flexible connections are deflected.

BRIEF DESCRIPTION OF THE FIGURES

Other advantages, aims and features of the present invention will appear from the following description given by way of example and in a non-limiting manner, with regard to the appended figures in which.

EXAMPLE(S) OF EMBODIMENTS OF THE INVENTION

Figure 1:
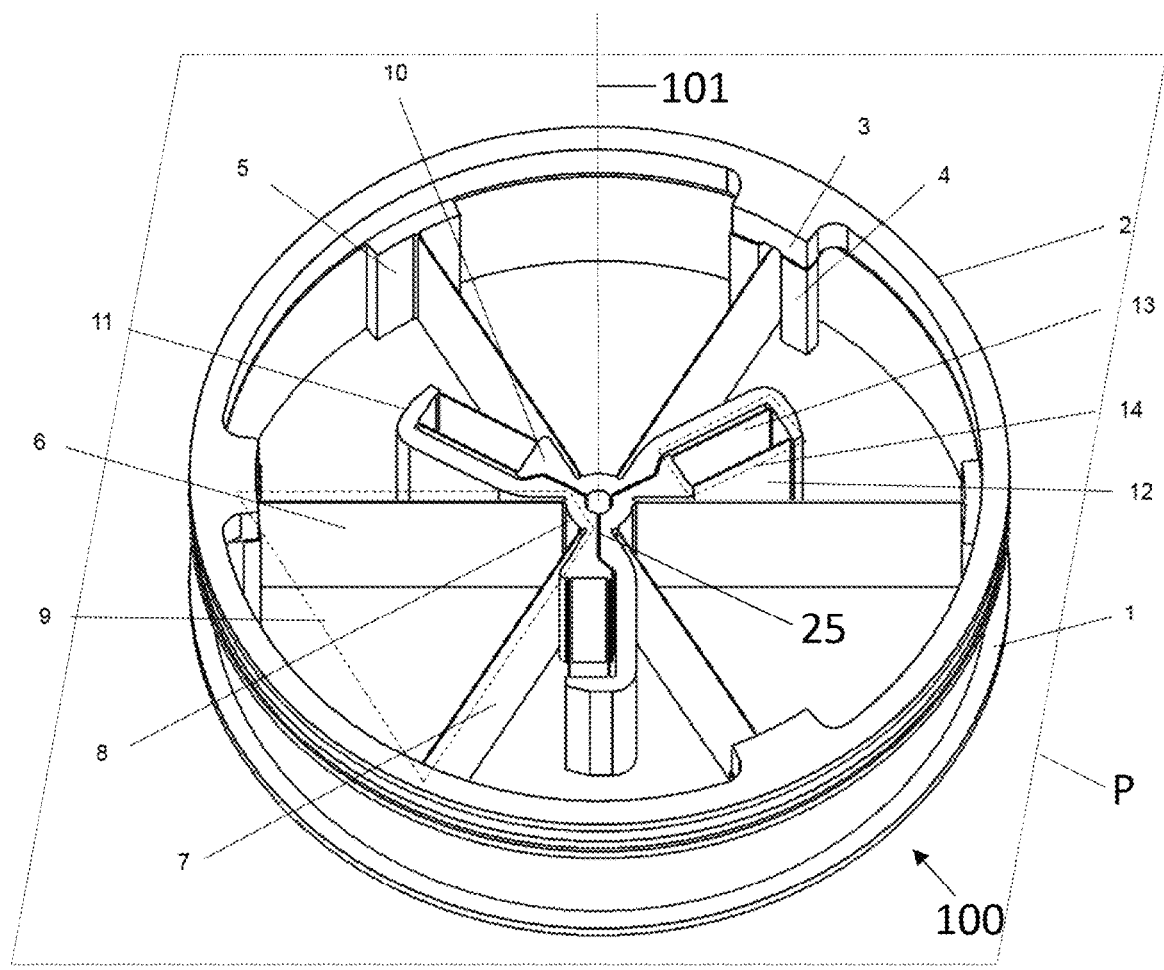
FIG. 1 shows a pivot mechanism for guiding in rotation, according to one embodiment.
Figure 2:
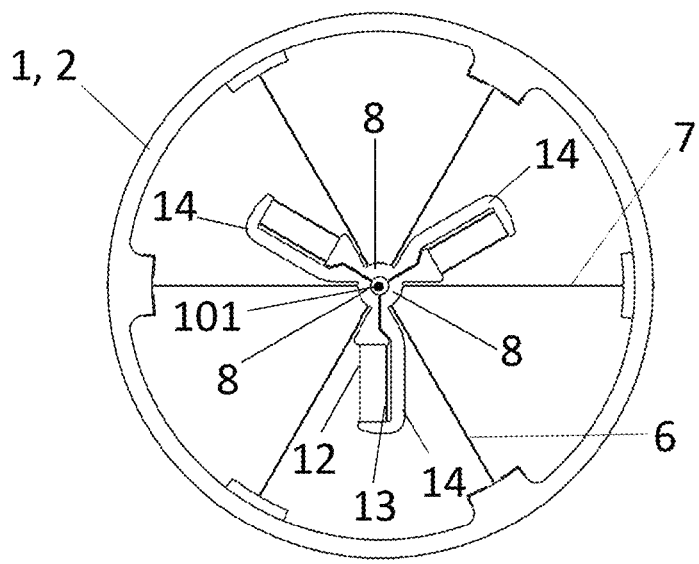
FIG. 2 shows a top view of the pivot mechanism of FIG. 1.

FIG. 1 shows an isometric view of a pivot mechanism 100 (also called "pivot" hereinafter) with radial symmetry and FIG. 2 shows a top view of the pivot 100 according to one embodiment. In particular, the pivot 100 comprises a mobile element 2 (taking the shape of a mobile ring in FIG. 1) connected to a fixed element 1 (also in the shape of a ring) through a number N of flexible (or articulated) connections 9. The fixed ring 1 is designed to be attached to a fixed base (not represented). The fixed base can be situated outside or inside the fixed ring 1. The value of N is 3 in the chosen example. In the embodiment of FIG. 1, each of the flexible connections 9 comprises a first main flexible blade 6 and a second main flexible blade 7, each of the main blades 6, 7 extending radially from the pivoting axis 101 of the pivot 100. The main blades 6, 7 are angularly spaced relative to each other by 60°, according to the example chosen, but could be spaced by another angle, for example an angle of 360/(2*N) degrees.

One extremity of the first main blade 6 is connected to the mobile ring 2 and the other extremity is connected to an intermediary junction 8. One extremity of the second main blade 7 is connected to a fixed ring 1 and the other extremity is connected to the intermediary junction 8. The intermediary junction 8 is arranged between the first main blade 6 and the second main blade 7, close to the pivoting axis 101. The first main blade 6, the intermediary junction 8 and the second main blade 7 are thus arranged kinematically in series. The configuration of the pivot 100 of FIG. 1 comprising three pairs of main blades 6, 7 thus comprises three intermediary junctions 8. In one configuration of the pivot 100 comprising N flexible connections 9, the pivot 100 will comprise N intermediary junctions 8.

Figure 10:
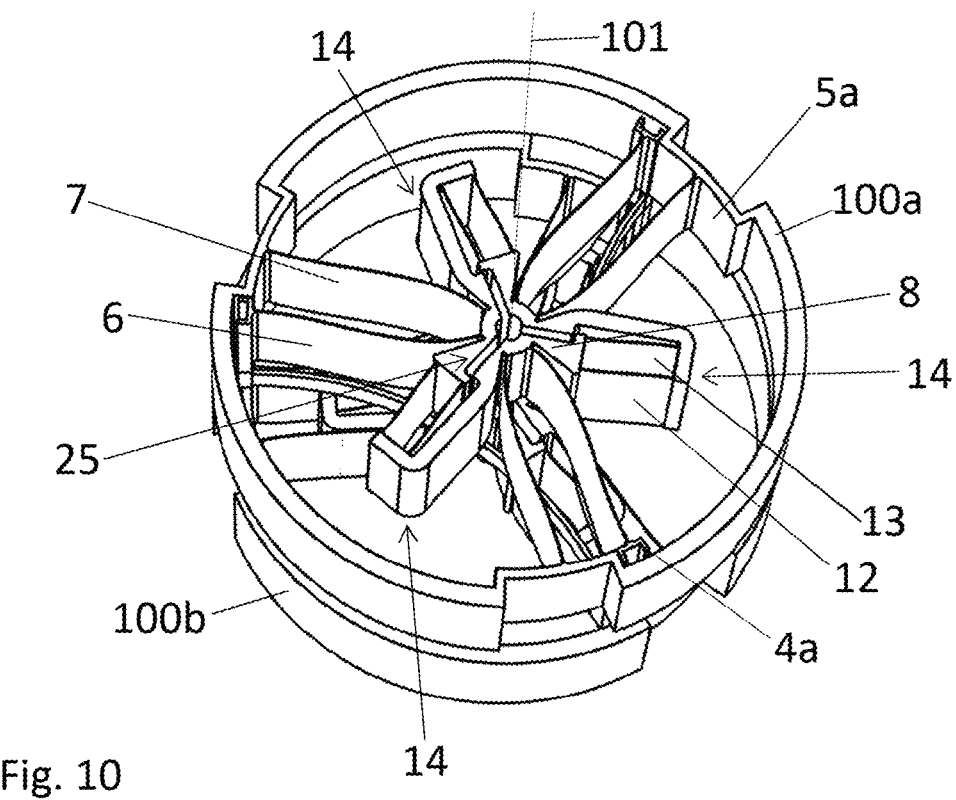
FIG. 10 shows the pivot assembly in an angularly pivoted position.

The flexible connections 9 are configured so as to guide a rotational movement, around the pivoting axis 101 of the pivot 100, of the mobile ring 2 in a plane P essentially perpendicular to the pivoting axis 101. In FIG. 1, the plane P is represented by the Cartesian coordinates x, y and the pivoting axis 101 extends along z. In particular, the flexible connections 9 exert a return force on the mobile ring 2 so that, 10 when the mobile ring 2 is pivoted along a given angle from a resting position, the latter pivots in oscillating fashion around the pivoting axis 101 with a first angular amplitude (or angular stroke) $\theta_1$ which depends on the flexible connections 9. Each of the intermediary junctions 8 comprises an expansion slot 25. During the rotation of the mobile ring 2, the expansion slot 25 can expand so as to allow a second angular 15 amplitude θ2 greater than the first angular amplitude $\theta_1$. FIG. 10 illustrates a pivot 100 in a pivoted position around the pivoting axis 101, showing the deflected first and second main blades 6, 7 and the expansion slot 25 of the intermediary junctions 8 in open configuration.

In the embodiment of the pivot 100 illustrated in FIG. 1, the first main blade 6 and the second main blade 7 extend between the pivoting axis 101 and the rings 1, 2 in the plane P. One extremity of the first main blade 6 is fixed on the mobile ring 2 through a first shifted connection 4 (preferably rigid), without contact with the fixed ring 1 and fixedly united with the mobile ring 2, for example through a rigid junction 3. The second main blade 7 is attached onto the fixed ring 1 through a second fixed connection 5.

In a preferred embodiment, the intermediary junctions 8 are connected to one another, two-by-two, by a coupling member 14.

In the example illustrated in FIG. 1, the coupling member 14 comprises two flexible coupling blades 12, 13, arranged in parallel manner and fastened at one of their extremities to a long rigid frame 11 fixedly united with the intermediary junction 8, and, at the other proximal extremity of the pivoting axis 101, to a short rigid frame 10, also fixedly united with the intermediary junction 8. In this configuration, the coupling member 14 forms a translation table 141 with parallel blades (see FIG. 13). The expansion slot 25 is preferably made between the long rigid frame 11 and the short rigid frame 10.

In a configuration where the intermediary junctions 8 comprise an expansion slot 25, each of the coupling members 14 is configured so as to prevent a movement out of the plane P of the mobile ring 2 and to achieve lateral rigidity, i.e. to prevent a lateral movement of the mobile ring 2 in the plane P (in other words, along x, y).

More particularly, the function of the coupling members 14 is to allow the simultaneous expansion of the expansion slots 25 of the intermediary junctions 8, whilst blocking the warping movement (torsion movement or movement out of the plane P) of the intermediary junctions 8, as well as their non-simultaneous expansion, i.e. their equidistance with the pivoting axis 101 of the pivot 100 (lateral rigidity).

Figure 3:
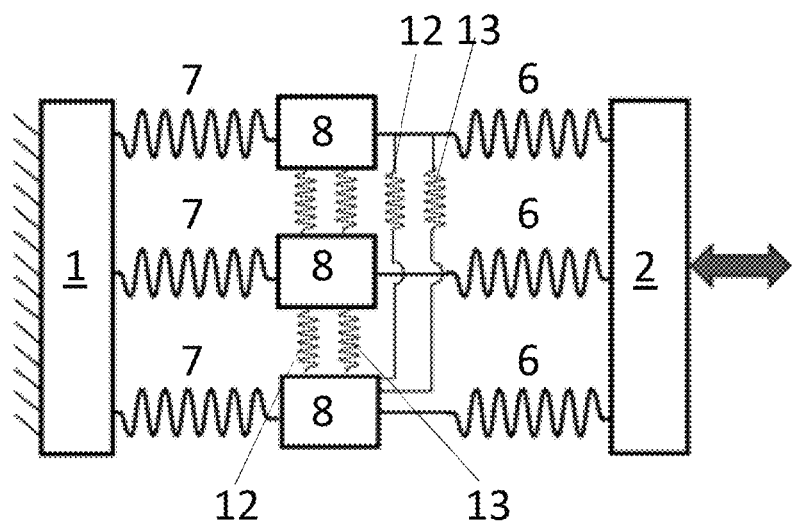
FIG. 3 shows a diagram of a linearized view of the kinematic connections of the pivot mechanism of FIG. 1.

The diagram of FIG. 3 shows a linearized view of the kinematic connections of the pivot 100 of FIG. 1. In the diagram, the fixed ring 1 (input) and the mobile ring 2 (output) are represented by the rectangles at the two extremities, the intermediary junctions 8 are represented by the rectangles between the "large springs" representing, on one side, the main blades 7 and, on the other side, the main blades 6. The coupling blades 12, 13 are represented by the "small springs". The mobile character of the mobile ring 2 is illustrated by the arrow.

Figure 4A:
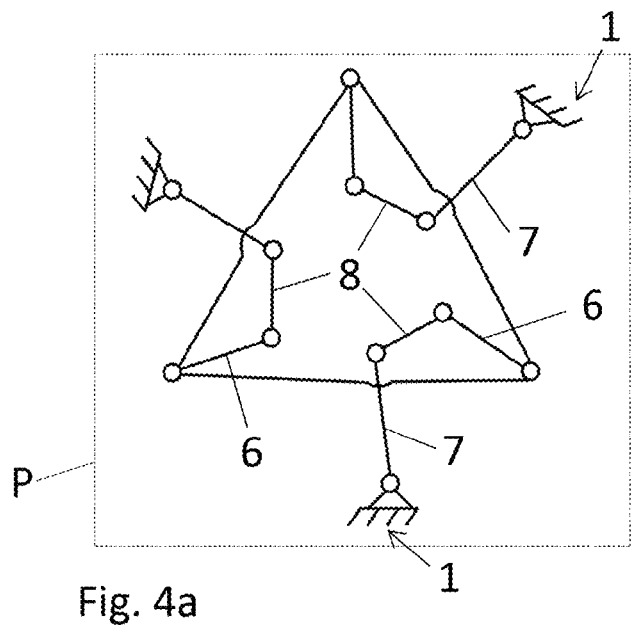
FIGS. 4a to 4d represent a diagram of a kinematic equivalent of the pivot mechanism of FIG. 1.

FIG. 4a shows an equivalent representation of the kinematics of the pivot mechanism 100 of FIG. 1. Each of the main blades 6, 7 are modelled by two notional pivot points (represented by circles) in the plane P. The rigid segments are symbolized by continuous lines, the fixed ring 1 by the anchoring symbols.

Figure 4B:
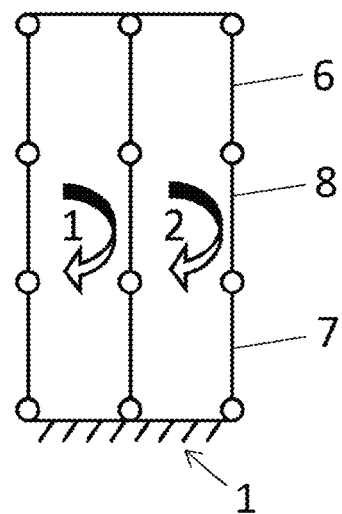

In order to show the number of kinematic loops, the diagram of FIG. 4a is rearranged in that of FIG. 4b. FIG. 4b shows that the main blades 6, 7 and the intermediary junctions 8 form two kinematic loops (represented by the arrows). Furthermore, the number of notional pivots is 12 (four notional pivots for the flexible connections comprising each a first and second main blade 6, 7 and an intermediary junction 8).

Figure 4C:
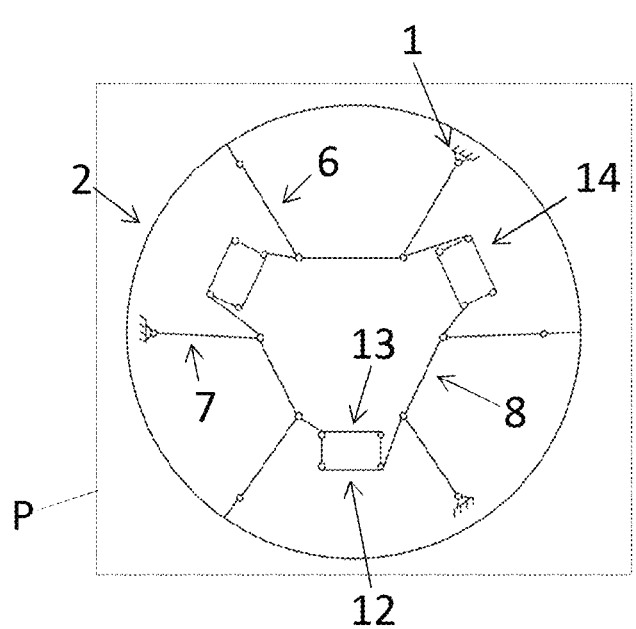
Figure 4D:
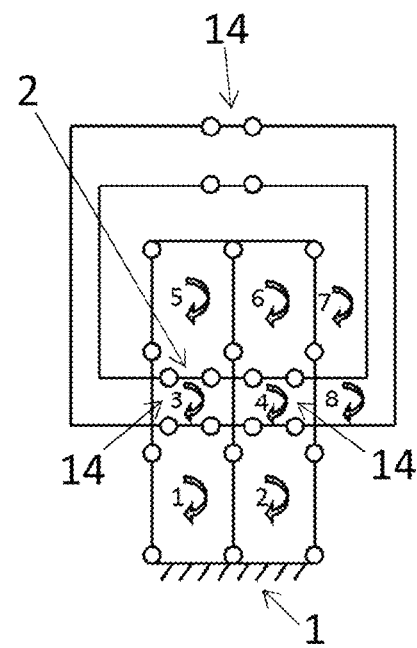

FIG. 4c shows an equivalent representation of the kinematics of the pivot mechanism 100 of FIG. 1 including the coupling blades 12, 13, modelled by two notional pivot points and including the mobile ring 2, represented by the circle. The rearranged FIG. 4d shows that the system comprises eight b kinematic loops (b=8). Furthermore, the number of notional pivots p corresponds to 24 (p=24).

Figure 5A:
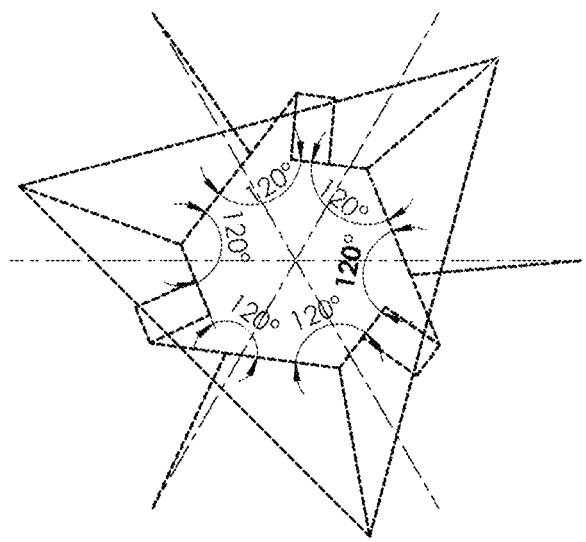
FIGS. 5a and 5b represent a diagram allowing the constraint of the pivot mechanism of FIG. 1 to be identified.
Figure 5B:
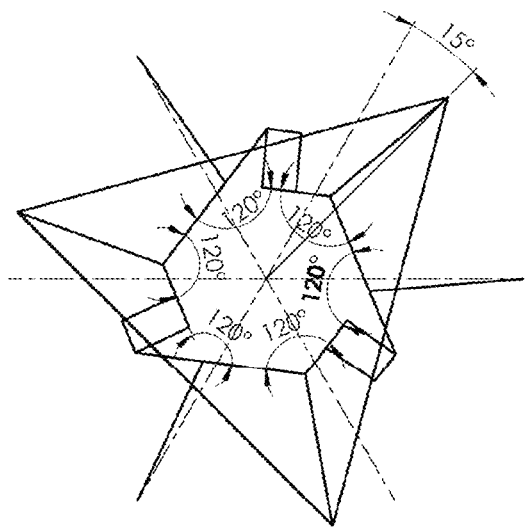

Each of the coupling members 14 has a degree of freedom in translation but freezes the other movements, notably the orientation of the segments adjacent to the coupling member 14. FIGS. 5a and 5b represent a diagram allowing the constraints on the pivot mechanism of FIG. 1 to be identified. In particular, FIGS. 5a and 5b allow the internal and external degrees of freedom of the pivot 100 with the coupling members 14 to be identified. In FIG. 5a, the whole structure of the pivot 100 is free to move, the unconstrained entities are represented in dashed lines. Each of the 120° angles represents a topological angle of the kinematic loop. In FIG. 1, each of these angles can represent the angle between the short rigid frame 10 and the long rigid frame 11 of two adjacent coupling members 14. The angle in bold represents an overconstraint on the pivot structure 100. In FIG. 5b, a single position constraint added on the output 2 of the mechanism (or example a displacement of 15° of the output 2) enables the whole of the structure to be blocked. The constrained (fixed) entities are in solid black line. The constrained entities are represented in solid lines.

Figure 5C:
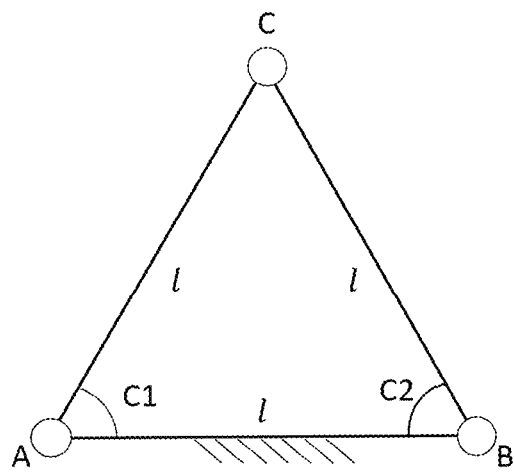
FIGS. 5c and 5d represent diagrammatically the overconstraint generated by the connection of three coupling members of the pivot mechanism.
Figure 5D:
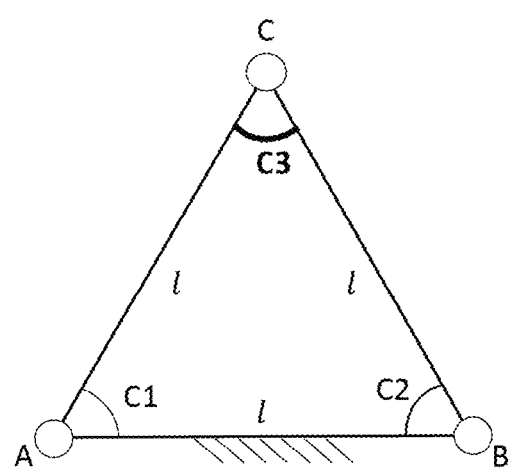

FIGS. 5c and 5d represent diagrammatically the constraint generated by the connection of the three coupling members 14. The points A, B and C represent the points connected by the coupling members 14. When the segment AB is fixed, the points A and B are defined. Then, from the insertion of the point A, the segment AC is fixed with a free length l and a given orientation, imposed by the angular constraint C1. Similarly, the segment BC is arranged with a variable length l and an orientation imposed by the constraint C2. Thus, the orientations of each of the segments of the triangle are defined. When the constraint C3, which defines the orientation between the segments AC and BC, is added, an overconstraint is added, since the latter is already given indirectly by the constraints C1 and C2 as well as by the typology of the connection.

FIGS. 5a to 5d show that the pivot mechanism 100 is isostatic externally. This means that the system is free to move with a degree of freedom in rotation (FIG. 5a) and the adding of a single angular position constraint blocks the entire mechanism (FIG. 5b). There is thus no internal degree of freedom ($DDL_{int}=0$) and there is only a single external degree of freedom ($DDL_{ext}=1$).

However, the structure exhibits an overconstraint C3. The central loop is defined by a supernumerary number of angular constraints. We thus have H=1.

Verifying the previously found values is done through the following equation, derived from the Grubler formula:

$$DDL_{ext}+DDL_{int}=H+p-(3\times b)$$

$$1+0=1+24-(3\times8) \quad \text{(equation 1)}$$

This analysis confirms the presence of an overconstraint and the absence of an internal degree of freedom. Internal degrees of freedom are understood to mean entirely free modes of displacement of part of the pivot mechanism 100. However, there are other modes of displacement that are not characterized by this analysis. There are for example vibration modes at the own frequencies of the pivot mechanism 100. These vibration modes correspond to the own vibration modes of the blades 6, 7 12, 13 as well as the rotation mode of the pivot 100 around the pivoting axis 101, comprising the intermediary junctions 8 and the coupling members 14. However, these displacement modes cannot be truly assimilated to degrees of freedom and have highly non-linear stiffness. They therefore do not result in high displacements. With respect to the own vibration modes of the blades 6, 7, 12, 13, they occur at very high frequencies and are thus not troublesome. Regarding the own rotation mode of the pivot mechanism 100 around the pivoting axis 101, comprising the intermediary junctions 8 and the coupling members 14, its angular displacement does not influence the centering position of the pivot 100. Thus, the quality of rotational guiding of the pivot 100 can be ensured.

The pivot 100 according to the invention is compact and is constituted only by near two-dimensional elements. Furthermore, the geometric center of the pivot 100 (corresponding to the pivoting axis 101) does not move during the deflection of the blades 6, 7, 12, 13 and the vibration modes have no effect on the position of the geometric center of the pivot 100. Furthermore, no internal mode is excited by an outer translational disturbance. Also, a very wide angular stroke can be achieved. This stroke depends directly on the number of flexible connections 9. Indeed, the higher their number, the more the mobile elements will quickly interfere with one another during the rotation. The coupling members 14 (with parallel blades) significantly increase the transverse stiffness of the pivot 100 and constitute one of the major improvements of this pivot over those of the state of the art. Finally, in order to increase the angular stroke, several similar pivots can easily be stacked without loss of performance characteristics.

The material constituting the parts of the pivot 100 is preferably a metal, but can also comprise quartz, glass, metallic glass, silicium or even a polymer.

The pivot 100 described here has many advantages. The pivot 100 notably allows a high angular stroke to be achieved, for example a second angular amplitude $\theta_2$ around 45° relative to a first angular amplitude $\theta_1$ which would typically be of around 10° to 15° in the case where the intermediary junctions 8 do not include any expansion slot 25. For example, the pivot 100 of the invention makes it possible to achieve an increase in amplitude (difference between the second angular $\theta_2$ and the first angular amplitude $\theta_1$) between two and four times the first angular amplitude $\theta_1$ at most, or typically between two times and three times the first angular amplitude $\theta_1$.

Good transverse stiffness performances (movement out of the plane P of the mobile ring 2) are achieved, even for high deflections of the pivot 100. For example, it is possible to obtain a stiffness ratio of 30,000 for Kr/KRz, where KRz is a linear stiffness having as its radius the outer dimension of the pivot 100. The ratio Kr/KRz corresponds to the quotient of the radial stiffness by the natural angular stiffness made to the outer diameter of the ring 1, 2, where the natural angular stiffness corresponds to the rotational stiffness of the pivot 100 around the pivoting axis 101. A stiffness ratio higher than 10,000 is accepted as characteristic value of a good flexure guide. The lateral stiffness of the pivot 100 are homogeneous, i.e. practically the same, whatever the radial dimension.

According to the dimensional characteristics of the pivot 100, it is possible to achieve a quasi-constant natural stiffness. The position of the geometric center of the pivot 100 (corresponding to the pivoting axis 101) does not vary during the course of the rotation in the lateral directions (lateral rigidity, preventing a movement in the plane P) and varies very little in the axial direction (i.e. in the direction of the pivoting axis 101).

The pivot 100 does not have any internal degrees of freedom. The pivot 100 has only very few overconstraints. It is possible, according to the mode of construction of the pivot 100, to have no overconstraint in the plane P.

Figures 6A, 6B, 6C, 6D, 6E:
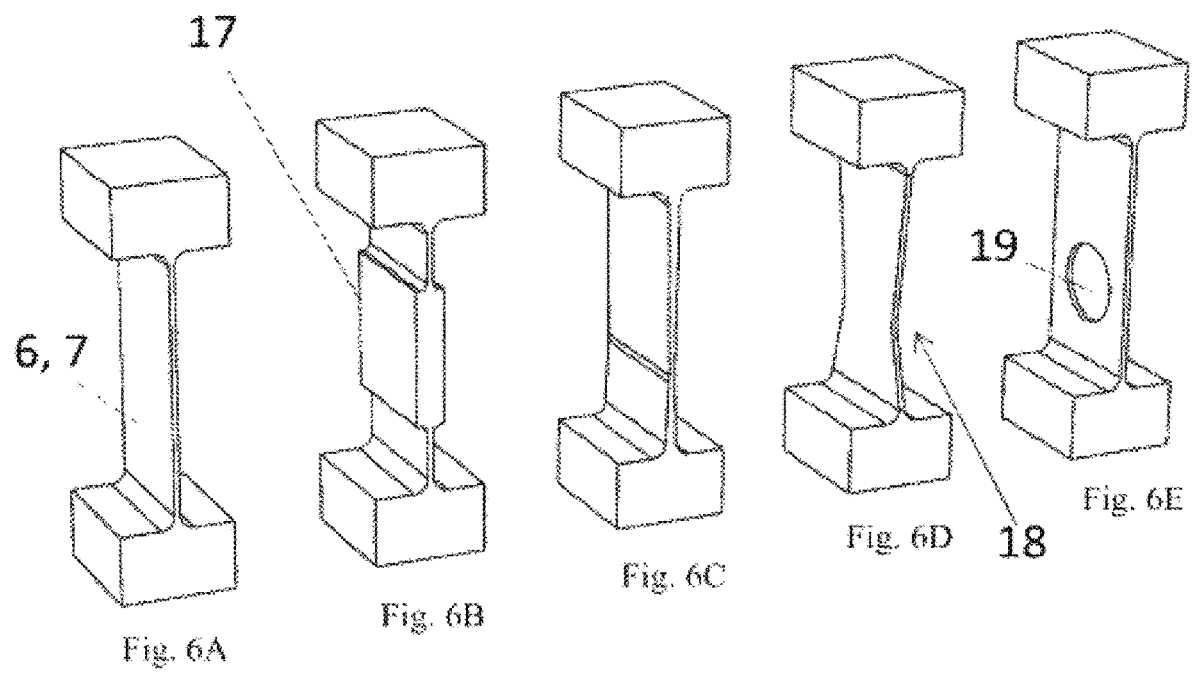
FIGS. 6a to 6e illustrate the main blades of the pivot mechanism, according to different embodiments.

According to an embodiment illustrated in FIG. 6, each of the main blades 6, 7 and/or coupling blades 12, 13, 16 are of straight type (FIG. 6a). Each of the main blades 6, 7 and/or coupling blades 12, 13, 16 can comprise a rigidifying portion 17 in their middle (FIG. 6b). Each of the main blades 6, 7 and/or coupling blades 12, 13, 16 can also comprise a non-straight profile 18, being for example narrowed at their inflection point 18 (FIG. 6c). Each of the main blades 6, 7 and/or coupling blades 12, 13, 16 can have a thickness that is straight but have a variation of stiffness through a non-constant width (FIG. 6d). The non-constant width can also be obtained through an opening 19 provided in the blade (FIG. 6e). The opening can have a circular, oval or rectangular shape along the longitudinal section of the blade. Extensively, each of the main blades 6, 7 and/or coupling blades 12, 13, 16 can have a profile defined by a polynomial function.

Other configurations (not represented) of the flexible connections 9 are also possible. For example, the first and second main blades 6, 7 can be arranged non-radially around the pivoting axis 101 but rather be offset laterally, i.e. relative to the radial direction. For example, the first and second main blades 6, 7 can be offset laterally in pairs, in order for each of the two blades 6, 7 to cross at a point that is offset relative to the geometric center of the pivot 100. A crossing of the blades 6, 7 is understood to be a virtual point of intersection, as there is no physical crossing of the blades. Alternatively, the main blades 6, 7 can be inclined relative to their radial orientation in the plane P (these blades are called tangential and cannot all meet at the center, on the pivoting axis 101). These variants make it possible to further increase the compactness of the pivot 100.

The coupling members 14 can take different forms. They can either be flexible members or sliding members or rolling members (see FIG. 7b).

Figure 7A:
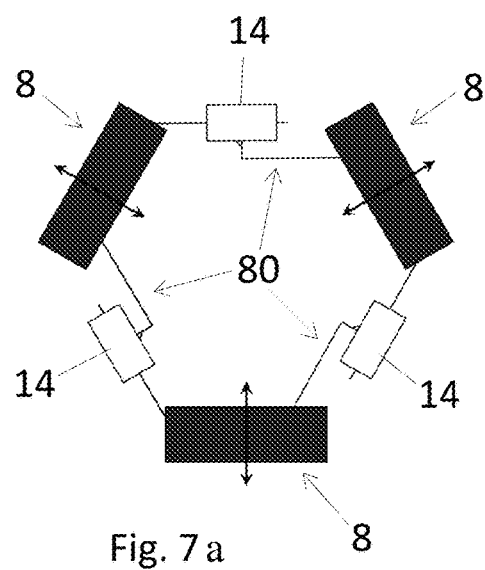
FIGS. 7a and 7b represent diagrammatically the coupling members of the pivot mechanism, according to one embodiment.
Figure 7B:
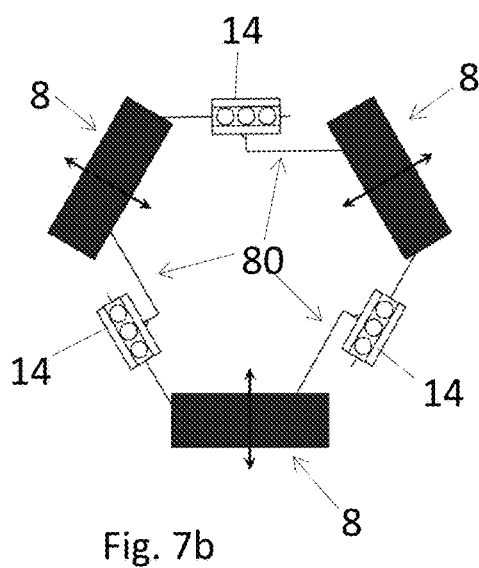

In FIG. 7, the three intermediary junctions 8 with the three coupling members 14 of the pivot mechanism 100 of FIG. 1 are represented diagrammatically, according to one embodiment. In particular, each of the coupling members 14 forms a slider represented by the sliding member 80, fixedly united with the intermediary junction 8 and capable of moving (sliding) laterally along the coupling member 14 when the pivot mechanism 100 is deflected. The coupling members 14 forming the slider allow the intermediary junctions 8 to have a relative expansion movement relative to one another, during the deflection of the pivot mechanism 100, whilst allowing a common movement of the intermediary junctions 8 around the pivot pin 100.

The coupling members 14 forming the slider can be implemented by flexible members (such as flexible blades). For example, two parallel flexible blades can be arranged to as to make a slider, such as a rail or linear table, by moving only in translation. A single blade can also be used in order to achieve guiding in translation. Any other assembly of flexible elements allowing a total or partial guiding of the intermediary junctions 8 relative to one another can also be used.

Figure 8A:
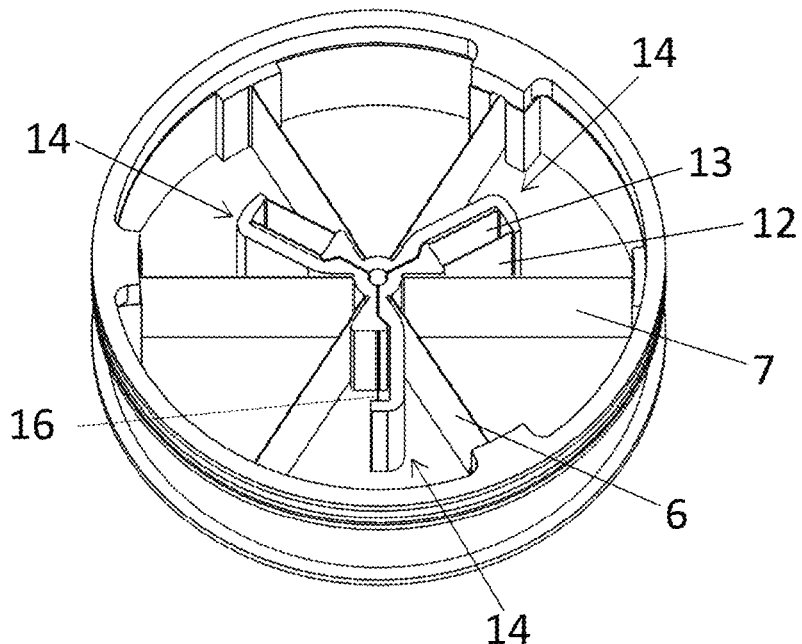
FIGS. 8a and 8b show an isometric view (FIG. 8a) and a top view (FIG. 8b) of the pivot mechanism according to another embodiment; 4
Figure 8B:
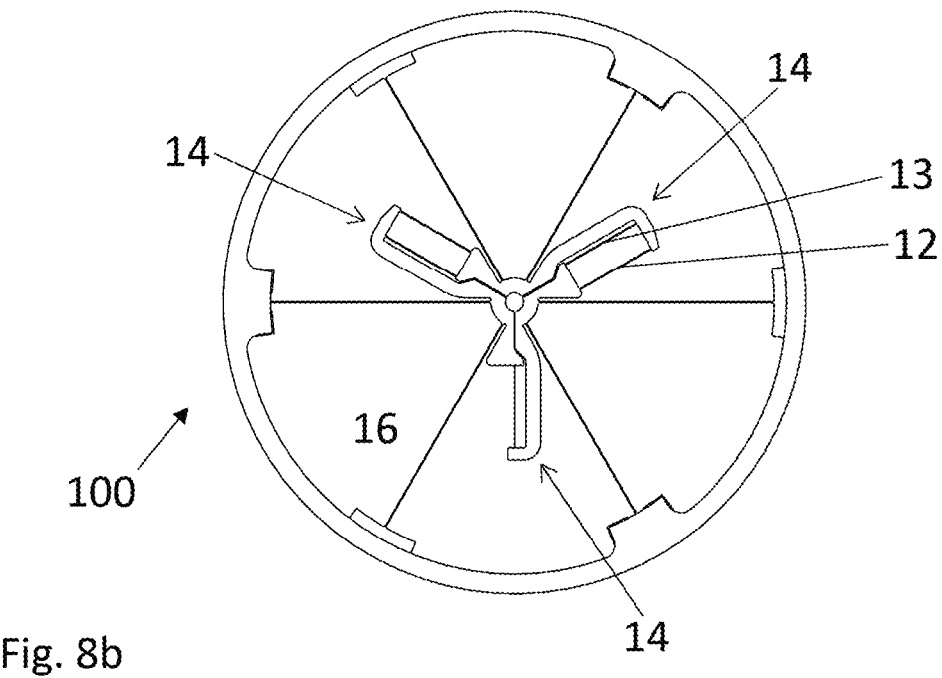

FIG. 8 shows an isometric view (FIG. 8a) and a top view (FIG. 8b) of the pivot 100 according to another embodiment. In this variant, one of the three coupling members 14 only has a single coupling blade 16. Thanks to this arrangement, it is possible to make the only planar overconstraint present in the configuration of the pivot 100 of FIG. 1 disappear.

Another advantage of this implementation is to make the pivot 100 isostatic. Indeed, according to the embodiment of FIGS. 1 and 2, the central kinematic loop is constituted by a series of three coupling members 14, each comprising two parallel coupling blades 12, 13, with each of the blades 12, 13 imposing the orientation in the plane P of an intermediary junction 8 relative to one another. Thus, when considering the kinematic chain formed by the coupling members 14 and the intermediary junctions 8 (see FIG. 4a), from an intermediary junction 8, one observes that the angular orientation of the segments is imposed all along the chain. When considering the kinematic loop (see FIG. 4b), one observes that the orientation of the start portion is imposed twice. This is where the overconstraint appears. However, in the case where the pivot 100 is machined in a single block, and in the absence of a thermal gradient within the pivot 100, this overconstraint has no detrimental effect.

It is obvious that the present invention is not limited to the embodiment which has just been described and that various modifications and simple variants can be envisaged by the one skilled in the art without falling outside the scope of the present invention.

For example, it is possible to assemble several pivots 100 and to stack them in order to obtain a pivot assembly having an even greater angular stroke.

Figure 9A:
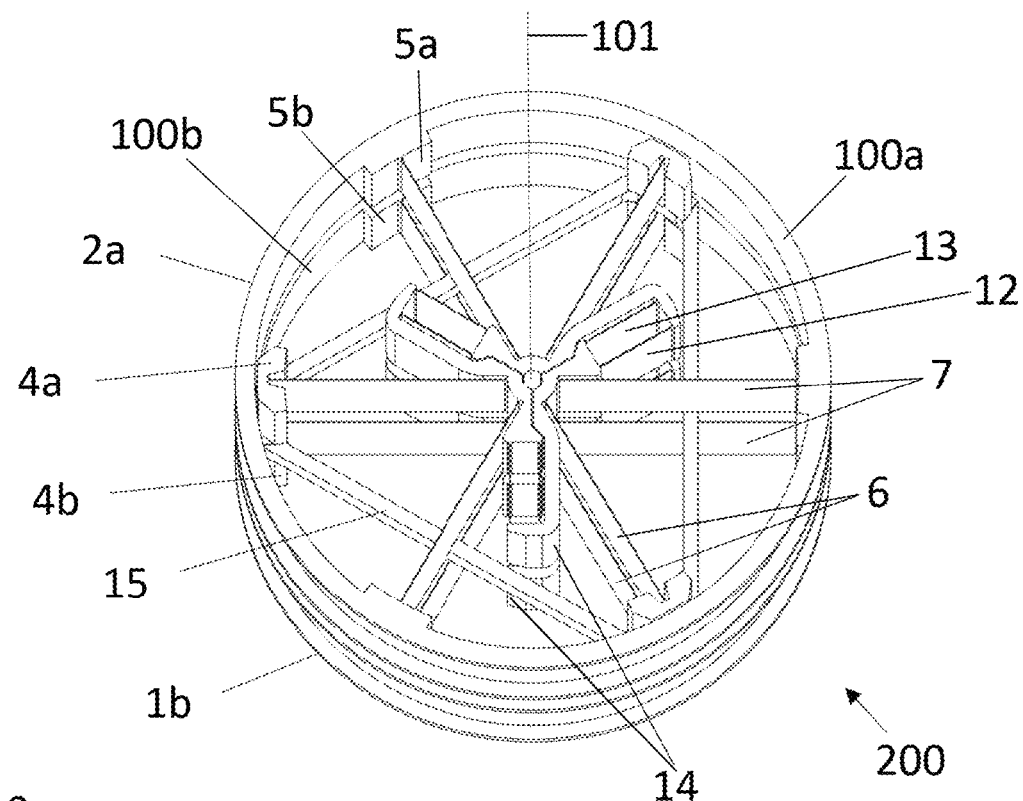
FIGS. 9a and 9b show an isometric view (FIG. 9a) and a top view (FIG. 9b) of a pivot assembly comprising two pivot mechanisms, according to one embodiment.
Figure 9B:
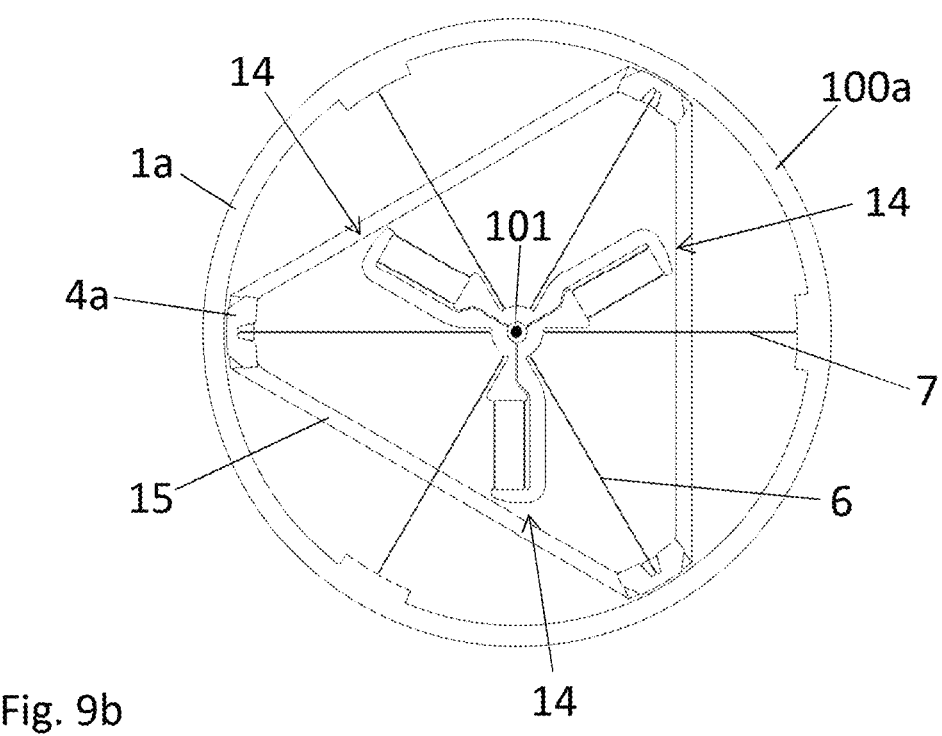

FIG. 9 shows an isometric view (FIG. 9a) and a top view (FIG. 9b) of a pivot assembly 200 according to one embodiment. The pivot assembly 200 comprises two pivot mechanisms 100a and 100b, mounted concentrically in superimposed fashion on the same pivoting axis 101. In this configuration, the mobile element (here, the mobile ring) 2a of the upper pivot 100a (upper level) and the fixed element (here, the fixed ring) 1b of the lower pivot 100b (lower level), represent respectively the output and the input of the pivot assembly 200. The mobile ring of the lower pivot 100b, which corresponds to the mobile ring 2 of the pivot 100 of FIG. 1, is replaced in the pivot assembly 200 by an inter-level coupling member 15, kinematically connected to the fixed ring 1b by means of the main blades 6, 7 of the lower pivot 100b and connected in rigid fashion to the mobile ring 2a of the upper pivot 100a. In the example illustrated in FIG. 9, the first main blade 6 of the lower pivot 100b is connected to the fixed ring 1b by means of a first lower connection 4b. The second main blade 7 of the lower pivot 100b is connected to the inter-level coupling member 15 by means of a second lower connection 4b. The first main blade 6 of the upper pivot 100a is connected to the inter-level coupling member 15 by means of a first upper connection 4b and the second main blade 7 of the upper pivot 100a is connected to the mobile ring 2a of the upper pivot 100a by means of a first upper connection 4a.

During operation, the fixed ring 1b can be fastened to a fixed base. The inter-level coupling member 15 pivots by flexing of the main blades 6, 7 (and the coupling blades 12, 13) of the lower pivot 100b and the mobile ring 2a of the upper pivot 100a, and flexing of the main blades 6, 7 (and the coupling blades 12, 13) of the upper pivot 100a. FIG. 10 shows the pivot assembly 200 in an angularly pivoted position around the pivoting axis 101. The main blades 6, 7 as well as the coupling blades 12, 13 in deflection can be seen. In case the angular stroke of the inter-level coupling member 15 and of the mobile ring of the upper pivot 100a is essentially the same, the angular stroke of the pivot assembly 200 is essentially double that of the simple pivot 100. The figure shows the expansion slot 25 enabling a greater radial expansion of the intermediary junctions 8 and increasing the angular stroke of each of the pivots 100a, 100b, 100c. The pivot assembly 200 comprising two pivots 100 makes it possible to achieve a high angular stroke, for example of around 90°.

Figure 11:
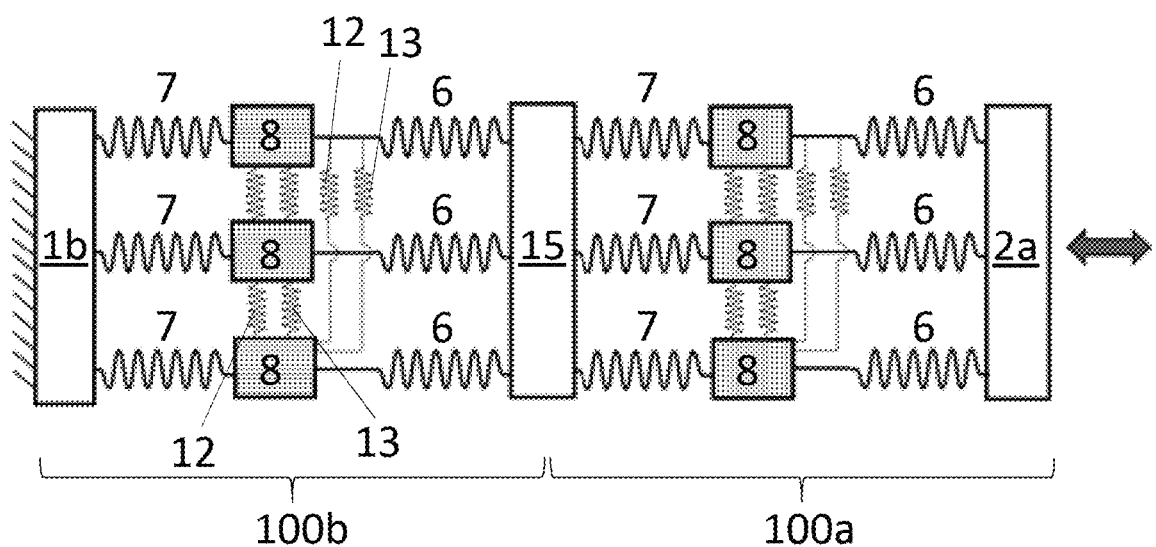
FIG. 11 represents a functional diagram of the pivot assembly according to the embodiment of FIG. 9.

FIG. 11 represents a functional diagram of the pivot assembly 200 according to the variant of FIG. 9. For each of the pivots 100a, 100b, the main blades 6, 7, the coupling blades 12, 13, the intermediary junctions 8 as well as the input (fixed ring) 1b and the output (mobile ring) 2a can be found. The pivot assembly 200 comprises an internal degree of freedom corresponding to the inter-level coupling member 15 which is free to pivot without constraint around the pivoting axis 101. However, as the mobile elements of the pivot assembly 200 (i.e. the mobile ring 2a of the upper pivot 100a and the inter-level coupling member 15) are axis-symmetrical (the mass center of these two elements is centered on the pivoting axis 101), the rotation of these mobile elements will not be affected by the shocks or vibrations in translation of the pivot assembly 200. In other words, the vibration mode in rotation of the inter-level coupling member 15 cannot be excited by a disturbance in translation exerted on the pivot assembly 200, with the mass center on 101 of the pivot assembly 200 only pivoting on the pivoting axis 101.

It will be understood that the pivot assembly 200 can comprise more than two pivots 100, for example three, or even M pivots 100. The pivots 100 of the pivot assembly 200 can be stacked either by axially offsetting one of the pivots relative to the other pivots 100. The pivots 100 of the pivot assembly 200 can also be stacked by chirality, i.e. two adjacent pivots in a stack of pivots 100 are arranged so as to be the mirror image of one another in the plan P.

Pivots such as described (the pivot assembly 200) can be stacked in order to obtain a pivot with a stroke increased by a factor equivalent to the number of levels. The pivot assembly 200 is compact and is constituted only by nearly two-dimensional elements. In other words, each of the pivots 100, 100a, 100b can be manufactured using bi-dimensional machining techniques.

Figure 12:
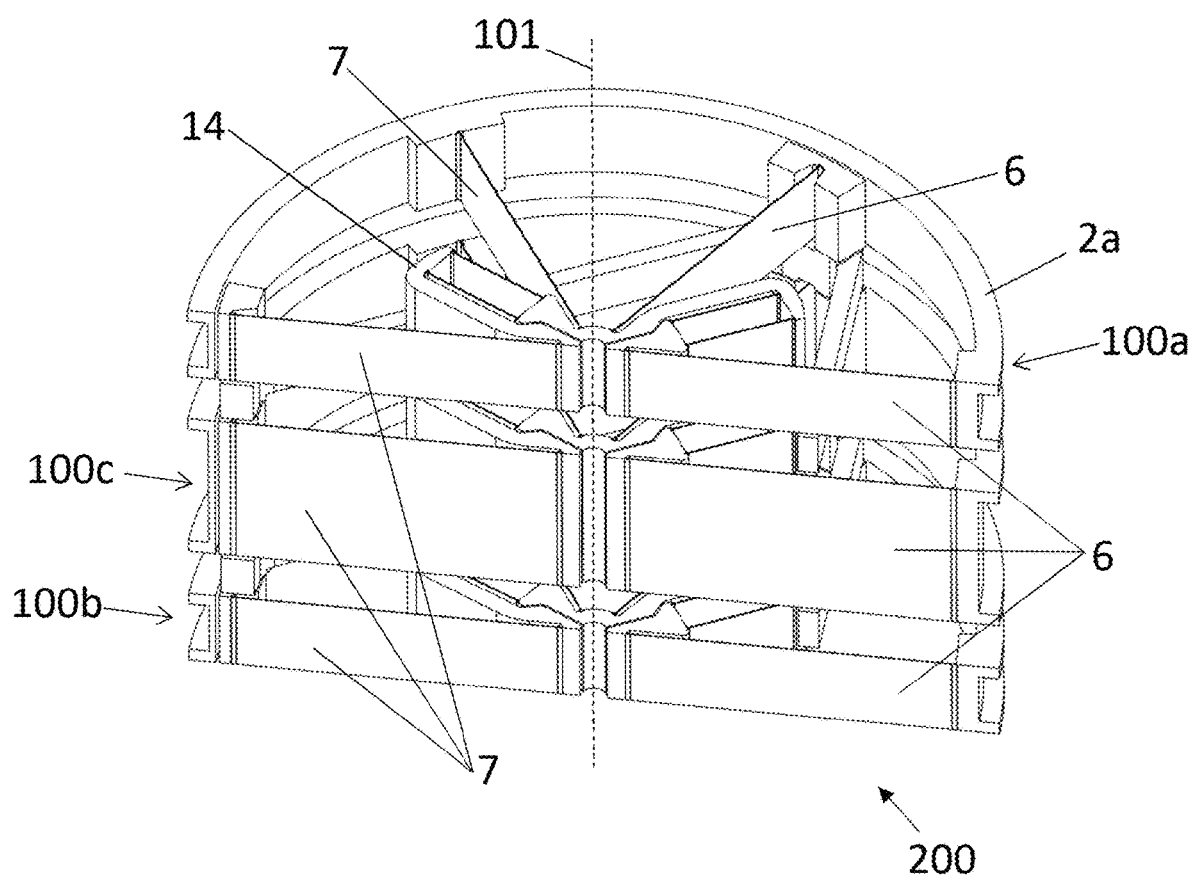
FIG. 12 shows an isometric cut view of the pivot assembly, according to another embodiment.

According to an embodiment represented in FIG. 12, the pivot assembly 200 comprises three pivot mechanisms superimposed concentrically on the same pivoting axis 101. For example, the pivot assembly 200 comprises an intermediary pivot 100c placed between an upper pivot 100a and a lower pivot 100b. The intermediary pivot 100c can have a greater thickness that that of the upper pivot 100a and lower pivot 100b. For example, the thickness of each of the upper pivot 100a and lower pivot 100b can be half of that of the intermediary pivot 100c. Such an arrangement allows the pivot assembly 200 to be more symmetrical relative to the plane P. In this manner, it is possible to minimize the torsion of the intermediary pivot 100c. Such a pivot assembly can comprise an inter-level coupling member 15 between the lower pivot 100b and the intermediary pivot 100c and between the intermediary pivot 100c and the upper pivot 100a. The two inter-level coupling members 15 can be fixedly united with one another. In this case, the pivot assembly 200 functions as if it comprised two pivots 100.

In the case of a pivot assembly 200 comprising several stacked pivots 100 (levels), the intermediary output or outputs 2 between each pivot 100 constitute an internal degree of freedom. It is thus possible to add an auxiliary mechanism allowing the internal degree(s) of freedom to be slaved to the external movement of the output of the pivot 100. In other words, it is possible to connect the mobile ring 2a of the output to the inter-level coupling member 15 so that the latter does half of the angular stroke relative to the upper mobile ring 2a.

In the case of a pivot assembly 200 comprising several stacked pivots 100 (levels), it is possible to angularly offset the output of the lower pivot 100b relative to the input of the upper pivot 100a, i.e. to create a static preload and shift the point of equilibrium of the inter-level coupling member. Thus, the angular position of the first main blade 6 of the lower pivot 100b is not co-planar of the first main blade 6 of the upper pivot 100a.

According to yet another embodiment, it is possible to deflect the coupling blades 12, 13 in order to reduce the angular stroke of the coupling member 14 (for example by half). To this effect, it is possible to either machine the coupling blades 12, 13 previously deflected according to their exact mode of deformation, or according to an approximate mode. It is also possible to machine essentially straight coupling blades 12, 13 and to deflect them by preloading and setting during a subsequent machining step.

Figures 13A, 13B, 13C:
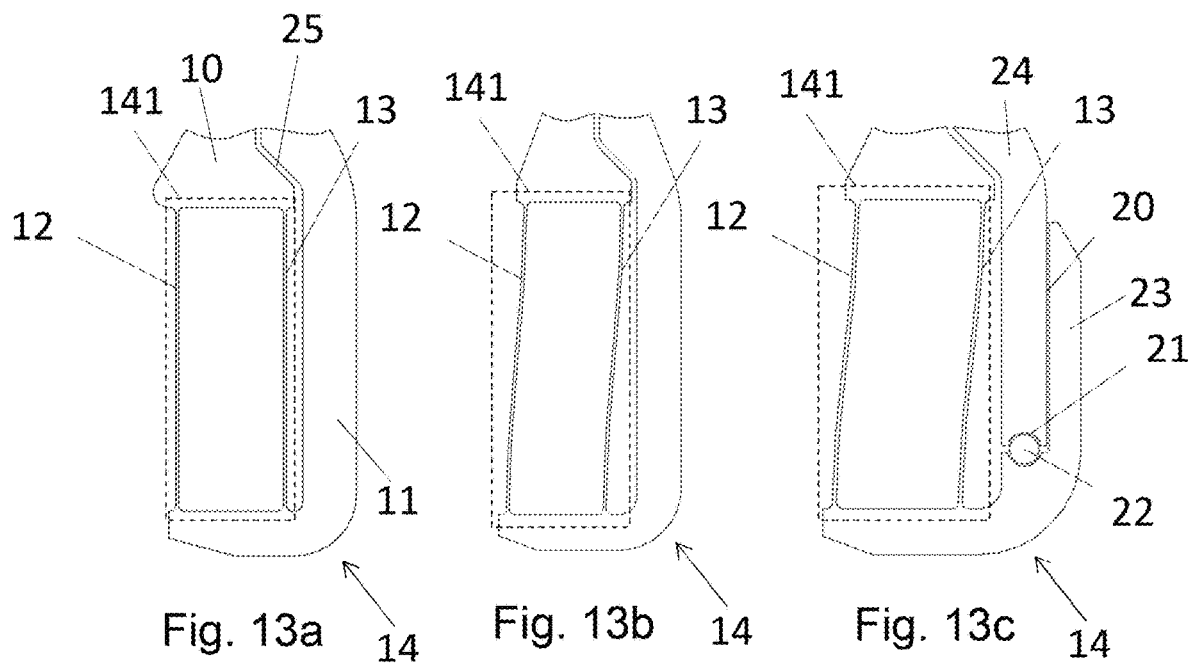
FIGS. 13a to 13c represent a coupling member of the pivot mechanism, according to different embodiments.

FIG. 13 illustrates the coupling member 14 comprising two parallel coupling blades 12, 13 according to three variants. In the variant of FIG. 13a, the coupling blades 12, 13 are machined essentially straight and not preloaded. In the variant of FIGS. 13b and 13c, the coupling blades 12, 13 are machined deformed and not preloaded, or also machined straight and then preloaded. In the latter two variants, the stiffness performances are improved for high deflection angles of the blades 12, 13 and the effects of the parasite movements of the coupling members 14 (quadratic effect) are reduced. In the variant of FIG. 13c, the effects are the same as in the variant of FIG. 13b but, additionally, the mechanical stress in the coupling blades 12, 13 is reduced.

FIG. 13c illustrates an example of a particular embodiment in which the long rigid frame 11 of the coupling member 14 comprises a slit 20 and a spindle 22 in a housing 21. This arrangement allows the straight coupling blades 12, 13 to be machined in the long rigid frame 11 when the slit 20 is enlarged, i.e. when a first portion 23 of the long rigid frame 11, on which one extremity of the blades 12, 13 is fastened, is moved away from a second portion 24 of the long rigid frame 11. Subsequently, the slit 20 is closed by moving the first portion 23 closer to the second portion 24, by flexion of the coupling blades 12, 13. After the slit 20 has been closed, the first portion 23 can be fixedly united with the second portion 24 by clamping, gluing or any other adequate means.

Figure 14:
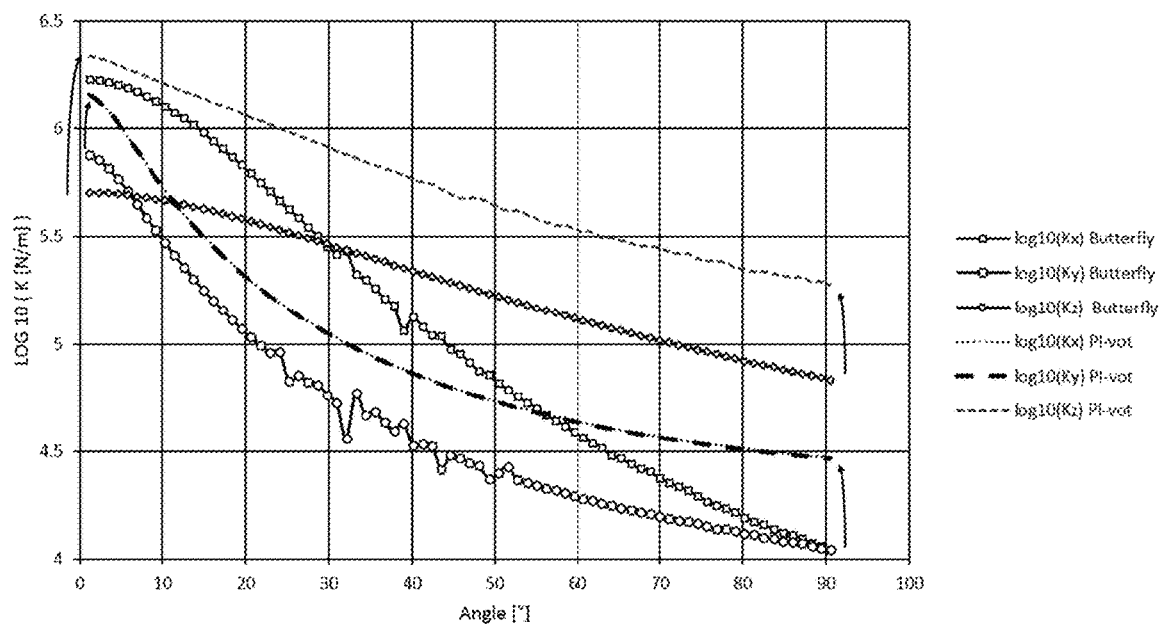
FIG. 14 compares the transverse stiffness performance of the inventive pivot mechanism with that of a pivot typical of flexible mechanisms.

FIG. 14 compares the transverse stiffness performances of the inventive pivot 100 with those of a typical pivot of flexible mechanisms, more particularly of a so-called "butterfly" flexible pivot such as described in the document "S. Henein, P. Spanoudakis, S. Droz, L. I. Myklebust, and E. Onillon, "Flexure pivot for aerospace mechanisms," in 10th European Space Mechanisms and Tribology Symposium, San Sebastian, Spain, 2003, pp. 285-288". It can be seen that a half order of magnitude on the three compared values at the end of the stroke. It must be noted that the comparison is made on a similar bi-dimensional basis.

It will be understood that at least one of the fixed element 1 and the mobile element 2 can take a shape other than that of a ring. For example, the fixed element 1 and/or the mobile element 2 can take a triangular, quadrilateral, polygonal, elliptical or any other shape. Preferably, the fixed element 1 and the mobile element 2 are arranged so that the center of inertia of the fixed element 1 and of the mobile element 2 coincide with the pivoting axis 101 of the pivot.

This pivot can be used for applications in the field of precision instruments, for space in particular, but also in the fields of robotics, high-precision industrial mechanisms, vacuum technology or also watchmaking.

REFERENCE NUMBERS USED IN THE FIGURES 1 fixed element, fixed ring
1b lower fixed ring
2 mobile element, mobile ring
2a mobile ring of the upper pivot 3 rigid junction
4 first connection
4a first upper connection
4b first lower connection
5 second fixed connection
6 first main blade
7 second main blade
8 intermediary junctions
9 flexible element
10 short rigid frame
11 long rigid frame
12, 13, 16 coupling blade
14 coupling member, parallel blades
141 translation table
15 inter-level coupling member
17 rigidifying portion
18 inflection point
19 opening
20 slit
21 housing
22 spindle
23 first portion
24 second portion
25 expansion slot
80 sliding element
100 pivot
100a upper pivot
100b lower pivot
100c intermediary pivot
101 pivoting axis of the pivot
200 pivot assembly
P plane
p nominal pivots
$\theta_1$ first angular amplitude
$\theta_2$ second angular amplitude

The invention claimed is:

1. A pivot mechanism for guiding in rotation, comprising:
a mobile element pivotally connected to a fixed element about a pivot axis through circumferentially-spaced flexible connections, the mobile element and fixed element comprising hollow outer bodies concentrically superimposed on each other about the pivot axis;
each of the flexible connections comprising:
an intermediary junction concentrically disposed about the pivot axis, wherein the intermediary junctions are coplanar within a plane perpendicular to the pivot axis and circumferentially spaced about the pivot axis;
each intermediary junction comprising a short rigid frame member and a long rigid frame member extending radially therefrom at opposing circumferential ends thereof, wherein each long rigid frame member is connected to an adjacent short rigid frame member of an adjacent intermediary junction via a respective coupling member extending radially therebetween;
a first main blade extending radially between and connecting the intermediary junction to an inner surface of the hollow outer body of the mobile element; and
a second main blade extending radially between and connecting the intermediary junction to an inner surface of the hollow outer body of the fixed element,
wherein each of said first and second main blades are configured to flex and define a first angular amplitude about the pivot axis;
each intermediary junction being separated from adjacent intermediary junctions by an expansion slot configured to expand during the rotation of the mobile element, so that the mobile element can pivot relative to the fixed element about the pivot axis according to a second angular amplitude that is greater than the first angular amplitude;
wherein each of the coupling members comprises at least one flexible coupling blade; and
wherein each of the coupling members is configured to allow simultaneous expansion of the expansion slots when the mobile element pivots relative to the fixed element about the pivot axis and to prevent a movement of the mobile element out of the plane and a lateral movement of the mobile element in the plane.

2. A pivot mechanism according to claim 1, wherein the coupling member comprises at least two coupling blades arranged in parallel manner.

3. A pivot mechanism according to claim 2, wherein extremities of the at least two coupling blades are fastened to the short and long rigid frame members.

4. A pivot mechanism according to claim 1, wherein one extremity of the second main blade is connected to the fixed element through a second fixed connection and one extremity of the first main blade is connected to the mobile element through a first fixed connection.

5. A pivot mechanism according to claim 1, wherein each of the first and second main blades comprises one or several rigidifying portions.

6. A pivot mechanism according to claim 1, wherein each of the first and second main blades comprise a non-straight profile.

7. A pivot mechanism according to claim 1, wherein each of the first and second main blades comprises a variation in cross-section along a longitudinal axis of the blade.

8. A pivot mechanism according to claim 7, wherein the variation in cross-section is achieved by a non-constant thickness or by a non-constant width.

9. A pivot mechanism according to claim 1, wherein each of the first and second main blades comprises at least one opening.

10. A pivot assembly comprising at least two pivot mechanisms according to claim 1, with the pivot mechanisms being mounted concentrically in superimposed fashion on the same pivoting axis.

11. A pivot assembly according to claim 10, wherein an upper pivot and a lower pivot are assembled with or without being reversed along a lateral axis of one of the two pivot mechanisms.

12. A pivot assembly according to claim 11, wherein one of the two pivot mechanisms is, or the two pivot mechanisms are, subjected to a pre-load during assembly.

* * * * *